(12) United States Patent
Gama et al.

(10) Patent No.: US 6,418,501 B1
(45) Date of Patent: Jul. 9, 2002

(54) MEMORY CARD

(75) Inventors: Shinkichi Gama; Yoshiki Okumura; Takeshi Nagase; Tomohiro Hayashi; Yoshihiro Takamatsuya, all of Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/280,708

(22) Filed: Mar. 30, 1999

(30) Foreign Application Priority Data

Jul. 29, 1998 (JP) .......................................... 10-213759

(51) Int. Cl.$^7$ .............................................. G06F 13/00
(52) U.S. Cl. .......................... 710/305; 710/62; 710/102
(58) Field of Search ................... 710/102, 62, 305–317

(56) References Cited

U.S. PATENT DOCUMENTS 5,579,487 A * 11/1996 Meyerson et al. .......... 710/100
5,941,963 A * 8/1999 Charles et al. ................ 710/62
6,292,863 B1 * 9/2001 Terasaki et al. ............. 710/129

* cited by examiner

Primary Examiner—Rupal Dharia
(74) Attorney, Agent, or Firm—Arent Fox Kintner Plotkin & Kahn, PLLC

(57) ABSTRACT

A memory card realizes two interface standards. The memory card includes an input terminal receiving a grounded or open-circuited signal from a host unit when using the memory card in conformance with a first interface standard, and receiving a binary signal from the host unit when using the memory card in conformance with a second interface standard, a first circuit acquiring standard information which indicates the first or second interface standard, from a signal issued from the host unit, a second circuit outputting a high-level voltage when using the memory card in conformance with the first interface standard and outputting a high-impedance signal when using the memory card in conformance with the second interface standard, depending on the standard information acquired by the first circuit, and a resistor coupling an output of the second circuit and the input terminal.

8 Claims, 13 Drawing Sheets

FIG. 5

| PIN NO. | SIGNAL NAME | FUNCTION | PIN NO. | SIGNAL NAME | FUNCTION |
|---|---|---|---|---|---|
| 1 | GND | GROUND | 18 | VPP1 | PROGRAMMING POWER SUPPLY 1 |
| 2 | D3 | DATA 3 | 19 | A16 | ADDRESS 16 |
| 3 | D4 | DATA 4 | 20 | A15 | ADDRESS 15 |
| 4 | D5 | DATA 5 | 21 | A12 | ADDRESS 12 |
| 5 | D6 | DATA 6 | 22 | A7 | ADDRESS 7 |
| 6 | D7 | DATA 7 | 23 | A6 | ADDRESS 6 |
| 7 | —CE1 | CARD ENABLE 1 | 24 | A5 | ADDRESS 5 |
| 8 | A10 | ADDRESS 10 | 25 | A4 | ADDRESS 4 |
| 9 | —OE | OUTPUT ENABLE | 26 | A3 | ADDRESS 3 |
| 10 | A11 | ADDRESS 11 | 27 | A2 | ADDRESS 2 |
| 11 | A9 | ADDRESS 9 | 28 | A1 | ADDRESS 1 |
| 12 | A8 | ADDRESS 8 | 29 | A0 | ADDRESS 0 |
| 13 | A13 | ADDRESS 13 | 30 | D0 | DATA 0 |
| 14 | A14 | ADDRESS 14 | 31 | D1 | DATA 1 |
| 15 | —WE/—PGM | WRITE ENABLE | 32 | D2 | DATA 2 |
| 16 | —IREQ | INTERRUPT REQUEST | 33 | —IOIS16 | 16-BIT I/O PORT |
| 17 | VCC | OPERATING POWER SUPPLY | 34 | GND | GROUND |

FIG. 6

| PIN NO. | SIGNAL NAME | FUNCTION | PIN NO. | SIGNAL NAME | FUNCTION |
|---|---|---|---|---|---|
| 35 | GND | GROUND | 52 | VPP2 | PROGRAMMING POWER SUPPLY 2 |
| 36 | −CD1 | CARD DETECTION 1 | 53 | A22 | ADDRESS 22 |
| 37 | D11 | DATA 11 | 54 | A23 | ADDRESS 23 |
| 38 | D12 | DATA 12 | 55 | A24 | ADDRESS 24 |
| 39 | D13 | DATA 13 | 56 | A25 | ADDRESS 25 |
| 40 | D14 | DATA 14 | 57 | −VS2 | POWER SUPPLY VOLTAGE SENSE 2 |
| 41 | D15 | DATA 15 | 58 | +RESET | RESET |
| 42 | −CE2 | CARD ENABLE 2 | 59 | −WAIT | WAIT |
| 43 | −VS1 | POWER SUPPLY VOLTAGE SENSE 1 | 60 | −INPACK | INPUT RESPONSE |
| 44 | −IORD | I/O READ | 61 | −REG | MEMORY SPACE SELECT |
| 45 | −IOWR | I/O WRITE | 62 | −SPKR | DIGITAL AUDIO SIGNAL |
| 46 | A17 | ADDRESS 17 | 63 | −STSCHG | CARD STATE CHANGE |
| 47 | A18 | ADDRESS 18 | 64 | D8 | DATA 8 |
| 48 | A19 | ADDRESS 19 | 65 | D9 | DATA 9 |
| 49 | A20 | ADDRESS 20 | 66 | D10 | DATA 10 |
| 50 | A21 | ADDRESS 21 | 67 | −CD2 | CARD DETECTION 2 |
| 51 | VCC | OPERATING POWER SUPPLY | 68 | GND | GROUND |

FIG. 7

| PIN NO. | SIGNAL NAME | FUNCTION | PIN NO. | SIGNAL NAME | FUNCTION |
|---|---|---|---|---|---|
| 1 | GND | GROUND | 18 | | |
| 2 | D3 | DATA 3 | 19 | | |
| 3 | D4 | DATA 4 | 20 | | |
| 4 | D5 | DATA 5 | 21 | | |
| 5 | D6 | DATA 6 | 22 | | |
| 6 | D7 | DATA 7 | 23 | | |
| 7 | −CE1 | CARD ENABLE 1 | 24 | | |
| 8 | | | 25 | | |
| 9 | −OE | OUTPUT ENABLE | 26 | | |
| 10 | | | 27 | A2 | ADDRESS 2 |
| 11 | | | 28 | A1 | ADDRESS 1 |
| 12 | | | 29 | A0 | ADDRESS 0 |
| 13 | | | 30 | D0 | DATA 0 |
| 14 | | | 31 | D1 | DATA 1 |
| 15 | −WE | WRITE ENABLE | 32 | D2 | DATA 2 |
| 16 | −IREQ | INTERRUPT REQUEST | 33 | −IOIS16 | 16-BIT I/O PORT |
| 17 | VCC | OPERATING POWER SUPPLY | 34 | GND | GROUND |

FIG. 8

| PIN NO. | SIGNAL NAME | FUNCTION | PIN NO. | SIGNAL NAME | FUNCTION |
|---|---|---|---|---|---|
| 35 | GND | GROUND | 52 | | |
| 36 | −CD1 | CARD DETECTION 1 | 53 | | |
| 37 | D11 | DATA 11 | 54 | −M/L | |
| 38 | D12 | DATA 12 | 55 | CSEL | CARD SELECT |
| 39 | D13 | DATA 13 | 56 | −VS2 | POWER SUPPLY VOLTAGE SENSE 2 |
| 40 | D14 | DATA 14 | 57 | +RESET | RESET |
| 41 | D15 | DATA 15 | 58 | −WAIT | WAIT |
| 42 | −CE2 | CARD ENABLE 2 | 59 | −INPACK | INPUT RESPONSE |
| 43 | −VS1 | POWER SUPPLY VOLTAGE SENSE 1 | 60 | −REG | MEMORY SPACE SELECT |
| 44 | −IORD | I/O READ | 61 | −SPKR | DIGITAL AUDIO SIGNAL |
| 45 | −IOWR | I/O WRITE | 62 | −STSCHG | CARD STATE CHANGE |
| 46 | | | 63 | D8 | DATA 8 |
| 47 | | | 64 | D9 | DATA 9 |
| 48 | | | 65 | D10 | DATA 10 |
| 49 | | | 66 | −CD2 | CARD DETECTION 2 |
| 50 | | | 67 | GND | GROUND |
| 51 | VCC | OPERATING POWER SUPPLY | 68 | | |

MEMORY CARD

BACKGROUND OF THE INVENTION

1. Field of the Invention

The present invention generally relates to memory cards which realize two interface standards such as a PCMCIA interface standard and an IDE interface standard, and more particularly to a memory card which accurately realizes the two interface standards.

The PCMCIA interface standard is provided as an interface standard for IC memory cards and input/output (I/O) cards. On the other hand, the IDE interface standard is provided as an interface standard for hard disks.

Recently, as an example of a method of using the memory card which is mounted with a memory such as a flash memory, it is known to set the memory card on a digital camera and to store images picked up by the digital camera into the memory card. The memory card which stores the images is inserted into and set in a PCMCIA sized slot of a personal computer, and the stored images are edited or processed in the personal computer. Accordingly, the memory card which is used in this manner must satisfy the PCMCIA interface standard so as to enable the memory card to be set and used on the personal computer, and the IDE interface standard so as to enable the memory card to be set and used on the digital camera. When realizing such two interface standards, it is important that the interface standards are realized accurately.

2. Description of the Related Art

The PCMCIA interface standard and the IDE interface standard are both an interface standard having a 68-pin structure.

But a 56th pin in particular introduces a problem when realizing these two interface standards on the same memory card.

According to the PCMCIA interface standard, the 56th pin is defined as a pin for an address 25. On the other hand, the 56th pin is defined as a pin for a CSEL signal according to the IDE interface standard.

According to the IDE interface standard, the CSEL signal is used as a signal for notifying from a host unit to a drive whether the drive is to be operated as a 0-system drive or a 1-system drive.

More particularly, when employing a construction in which a 56th pin of a drive 502 is connected to a power supply (for example, 5 V) via a pull-up resistor R as shown in FIGS. 1A and 1B, a host unit 501 notifies the drive 502 that the drive 502 is to be operated as a 0-system drive by outputting a grounded CSEL signal from a 56th pin of the host unit 501 as shown in FIG. 1A. On the other hand, the host unit 501 notifies the drive 502 that the drive 502 is to be operated as a 1-system drive by outputting an open-circuited CSEL signal from the 56th pin of the host unit 501 as shown in FIG. 1B.

Accordingly, when the memory card is used under the PCMCIA interface standard, it is necessary to connect to the 56th pin, which is defined as the pin for the address 25, a pull-up resistor R which is connected to the power supply as shown in FIG. 2.

Even if the pull-up resistor R is connected to the 56th pin which is defined as the pin for the address 25 when using the memory card under the PCMCIA interface standard, the address data transferred to the address 25 should not be affected in principle.

However, the fact that the pull-up resistor R is connected to the 56th pin which is defined as the pin for the address 25 is not desirable, because the PCMCIA interface standard is not accurately realized by such an arrangement.

Furthermore, when the pull-up resistor R is connected as described above, there is a possibility that a bit of the address data transferred to the address 25 will become distorted and inverted. This bit inversion causes more serious problems than the fact that the PCMCIA interface standard is not accurately realized.

SUMMARY OF THE INVENTION

Accordingly, it is a general object of the present invention to provide a novel and useful memory card in which the problems described above are eliminated.

Another and more specific object of the present invention is to provide a memory card which can accurately realize two interface standards when employing a construction for realizing two interface standards such as the PCMCIA interface standard and the IDE interface standard.

Still another object of the present invention is to provide a memory card which realizes two interface standards, comprising an input terminal receiving a grounded or open-circuited signal from a host unit when using the memory card in conformance with a first interface standard, and receiving a binary signal from the host unit when using the memory card in conformance with a second interface standard, a first circuit acquiring standard information which indicates the first or second interface standard, from a signal issued from the host unit, a second circuit outputting a high-level voltage when using the memory card in conformance with the first interface standard and outputting a high-impedance signal when using the memory card in conformance with the second interface standard, depending on the standard information acquired by the first circuit, and a resistor coupling an output of the second circuit and the input terminal. According to the memory card of the present invention, it is possible to accurately realize two interface standards. Further, since it is possible to provide a memory card which is in conformance with the two interface standards, it is possible to realize accurate data write and data read with respect to a memory of the memory card.

A further object of the present invention is to provide a memory card comprising an input terminal receiving a grounded or open-circuited signal when using the memory card in conformance with a first interface standard, and receiving a binary signal when using the memory card in conformance with a second interface standard, a first circuit acquiring standard information which indicates the first or second interface standard, from an external signal, a second circuit having an output terminal which outputs a high-level signal when using the memory card in conformance with the first interface standard and outputs a high-impedance signal when using the memory card in conformance with the second interface standard, depending on the standard information acquired by the first circuit, and a resistor coupling the output of the second circuit and the input terminal. According to the memory card of the present invention, it is possible to accurately realize two interface standards. Further, since it is possible to provide a memory card which is in conformance with the two interface standards, it is possible to realize accurate data write and data read with respect to a memory of the memory card.

Other objects and further features of the present invention will be apparent from the following detailed description when read in conjunction with the accompanying drawings.

BRIEF DESCRIPTION OF THE DRAWINGS

FIG. 5 is a diagram for explaining the PCMCIA interface standard;

FIG. 6 is a diagram for explaining the PCMCIA interface standard;

FIG. 7 is a diagram for explaining the IDE interface standard;

FIG. 8 is a diagram for explaining the IDE interface standard;

DESCRIPTION OF THE PREFERRED EMBODIMENTS

Figure 3:
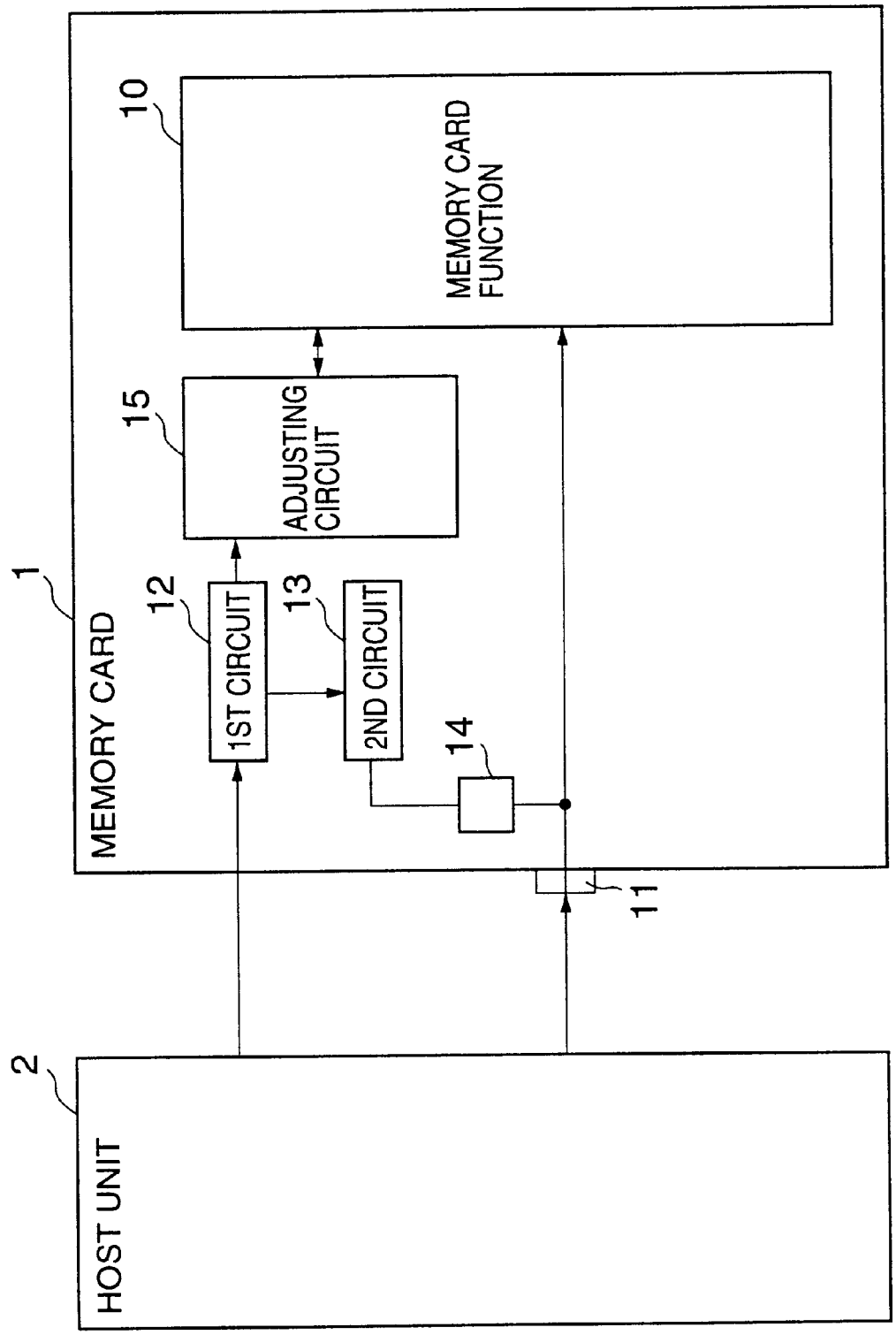
FIG. 3 is a system block diagram for explaining the operating principle of the present invention.

First, a description will be given of the operating principle of the present invention, by referring to FIG. 3. In FIG. 3, a memory card 1 according to the present invention realizes two interface standards. This memory card 1 is loaded into or is connected to a host unit 2.

The memory card 1 includes a memory card function 10, an input terminal 11, a first circuit 12, a second circuit 13, a resistor 14, and an adjusting circuit 15 which are connected as shown in FIG. 3. The memory card function 10 is formed by a memory, a controller and the like. The input terminal 11 receives a grounded or open-circuited signal from a terminal of the host unit 2 when using the memory card 1 under one interface standard, and receives a binary signal from the terminal of the host unit 2 when using the memory card 1 under another interface standard. The first circuit 12 obtains standard information indicating the interface standard under which the memory card 1 is to be used based on a signal issued from the host unit 2. The second circuit 13 outputs a high-level voltage when the memory card 1 is to be used under the interface standard in which the input terminal 11 receives the grounded or open-circuited signal, and outputs a high impedance when the memory card 1 is to be used under the interface standard in which the input terminal 11 receives the binary signal, depending on the standard information obtained by the first circuit 12. The resistor 14 connects an output of the second circuit 13 and the input terminal 11. The adjusting circuit 15 carries out an adjusting process to realize the two interface standards, depending on the standard information obtained by the first circuit 12.

According to the memory card 1 of the present invention having the construction described above, the first circuit 12 obtains the standard information which indicates the interface standard under which the memory card 1 is to be used, by sampling and latching the signal issued from the host unit 2 by us of a power-ON reset signal when the power is turned ON, for example.

The second circuit 13 has a tristate buffer structure which uses the signal latched by the first circuit 12 as a control signal, for example, responsive to the standard information obtained by the first circuit 12. Based on this control signal, the second circuit 13 outputs the high-level voltage when the memory card 1 is to be used under the interface standard in which the input terminal 11 receives the grounded or open-circuited signal, and outputs the high impedance when the memory card 1 is to be used under the interface standard in which the input terminal 11 receives the binary signal.

In the memory card 1 of the present invention, when the memory card 1 is used under the interface standard in which the input terminal 11 receives the grounded or open-circuited signal, the resistor 14 functions as a pull-up resistor, thereby judging that the input terminal 11 receives the grounded or open-circuited signal, depending on the high-level voltage output from the second circuit 13. Hence, it is possible to accurately realize the interface standard.

On the other hand, when the memory card 1 is used under the interface standard in which the input terminal 11 receives the binary signal, the resistor 14 may be regarded as if it does not exist, due to the high-impedance output from the second circuit 13. Hence, it is possible to accurately input the binary signal received by the input terminal 11, and it is possible to accurately realize the interface standard.

Figure 4:
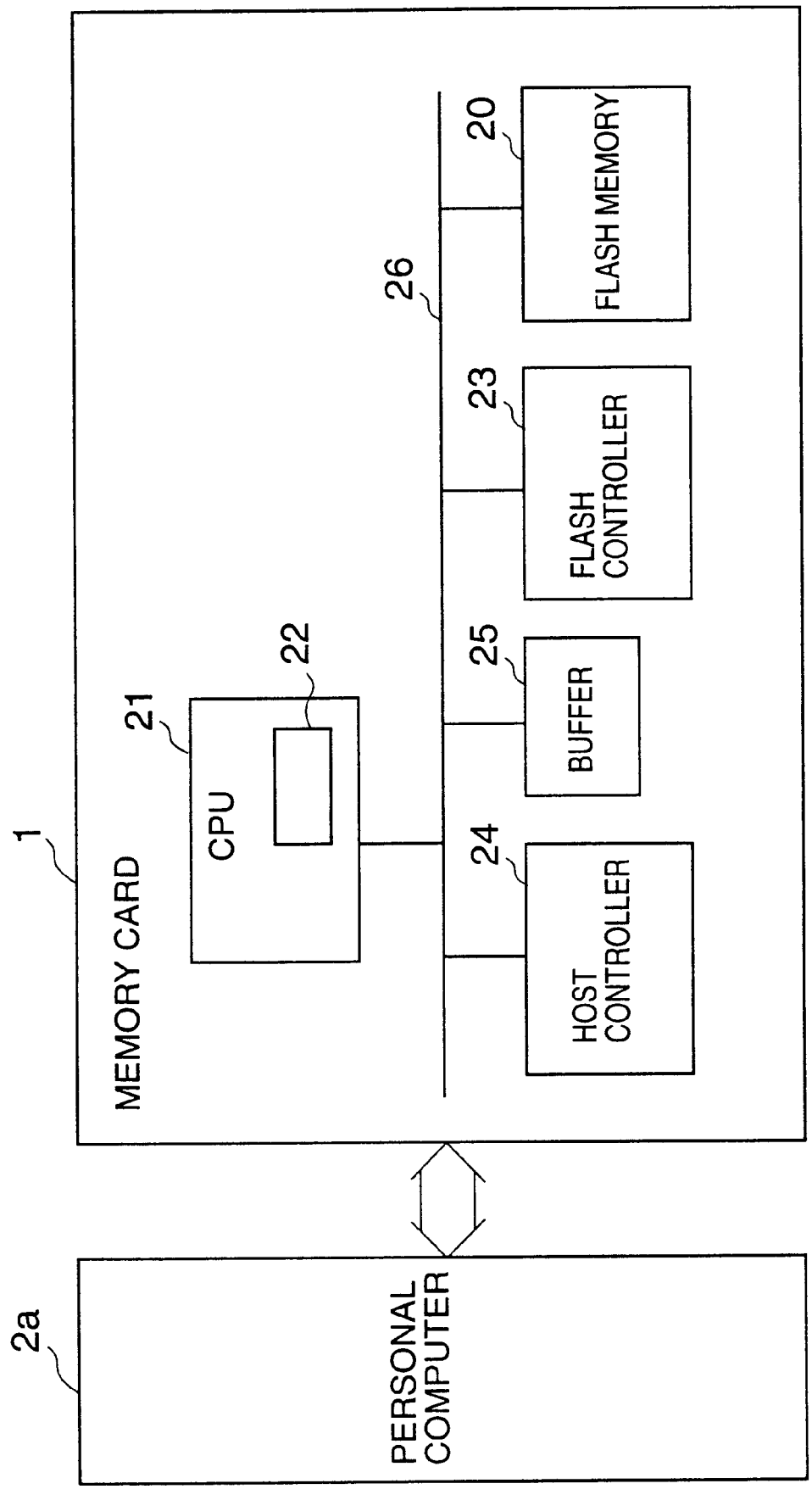
FIG. 4 is a system block diagram showing an embodiment of a memory card according to the present invention.

Next, a description will be given of an embodiment of the memory card according to the present invention. FIG. 4 is a system block diagram showing the circuit construction of this embodiment of the memory card according to the present invention.

As shown in FIG. 4, the memory card 1 includes a flash memory 20, for example, and carries out an access process with respect to this flash memory 20 in response to an access request issued from a personal computer 2a. In order to realize this access process, the memory card 1 includes, in addition to the flash memory 20, a CPU 21 having a ROM 22, a flash controller 23, a host controller 24, a buffer 25, and a bus 26 which are connected as shown in FIG. 4.

The ROM 22 stores a program for realizing the access to the flash memory 20. When the personal computer 2a issues the access request, the CPU 21 issues an access instruction with respect to the flash controller 23 according to the program stored in the ROM 22, and carries out the process of making access to the flash memory 20.

When the access instruction is issued from the CPU 21, the flash controller 23 acquires the right to use the bus 26, and issues a flash command with respect to the flash memory 20, so as to make access to the flash memory 20. The buffer 25 stores the data to be written into the flash memory 20, and stores the data read from the flash memory 20. The host controller 24 carries out an interface process between the personal computer 2a and the memory card 1.

In this embodiment, the memory card 1 can realize two interface standards between the personal computer 2a and the memory card 1. More particularly, this embodiment realizes the PCMCIA interface standard and the IDE interface standard.

The PCMCIA interface standard is provided as an interface standard for the IC memory cards, I/O cards and the like. According to the PCMCIA interface standard, signals are allocated to connection terminals having the 68-pin structure provided between the personal computer 2a and the card, as shown in FIGS. 5 and 6.

On the other hand, the IDE interface standard is provided as an interface standard for the hard disk. According to the IDE interface standard, signals are allocated to connection terminals having the 68-pin structure provided between the personal computer 2a and the hard disk, as shown in FIGS. 7 and 8.

As may be seen from FIG. 6, the address 25 is allocated with respect to the 56th pin according to the PCMCIA interface standard. But according to the IDE interface standard, a CSEL signal is allocated with respect to the 56th pin as shown in FIG. 8.

Figure 1A:
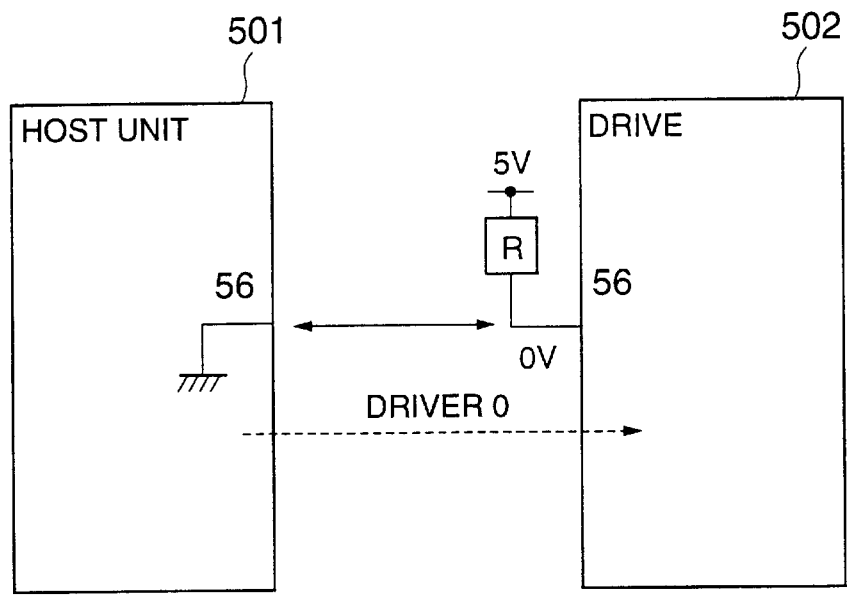
FIGS. 1A and 1B respectively are diagrams for explaining the IDE interface standard.
Figure 1B:
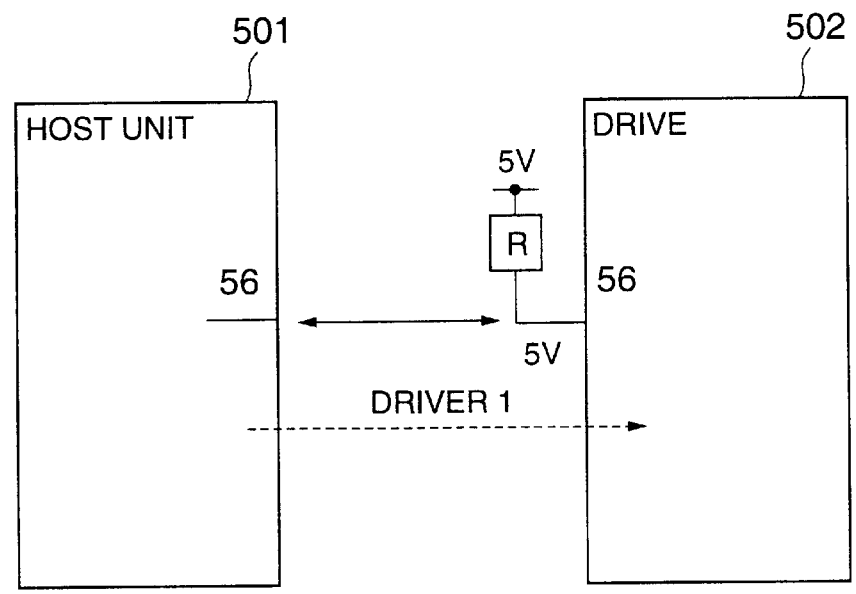
Figure 2:
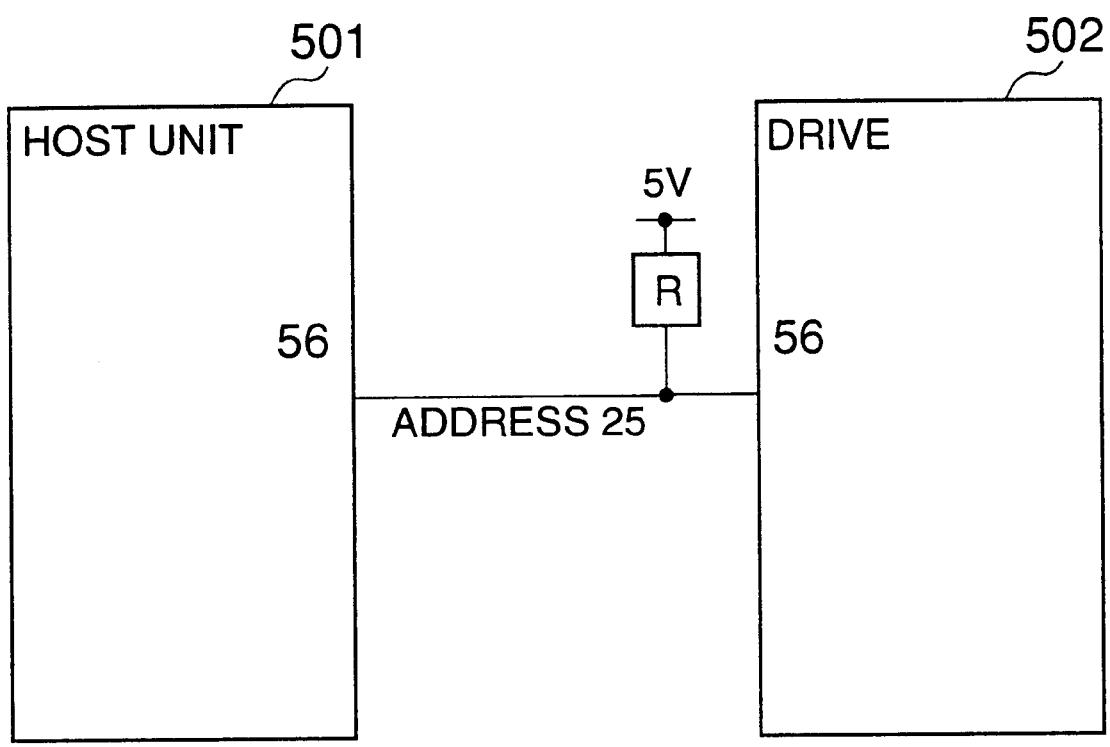
FIG. 2 is a diagram for explaining the PCMCIA interface standard.

The CSEL signal is used as a signal for notifying from the personal computer 2a to the memory card 1 whether the memory card 1 is to be operated as a 0-system drive or a 1-system drive. More particularly, as described above in conjunction with FIGS. 1A and 1B, the personal computer 2a notifies the memory card 1 that the memory card 1 is to be operated as a 0-system drive by outputting a grounded CSEL signal. On the other hand, the personal computer 2a notifies the memory card 1 that the memory card 1 is to be operated as a 1-system drive by outputting an open-circuited CSEL signal.

In addition, as will be described later, an output enable signal output from a 9th pin is used as a signal for notifying from the personal computer 2a to the memory card 1 whether the memory card 1 is to operate under the PCMCIA interface standard or the IDE interface standard.

According to the PCMCIA interface standard, the output enable signal output from the 9th pin has a high level when the power is turned ON, and thereafter assumes a high level or a low level in response to an enable instruction. But according to the IDE interface standard, the output enable signal output from the 9th pin always has a low level, and is not limited to the time when the power is turned ON.

Figure 9:
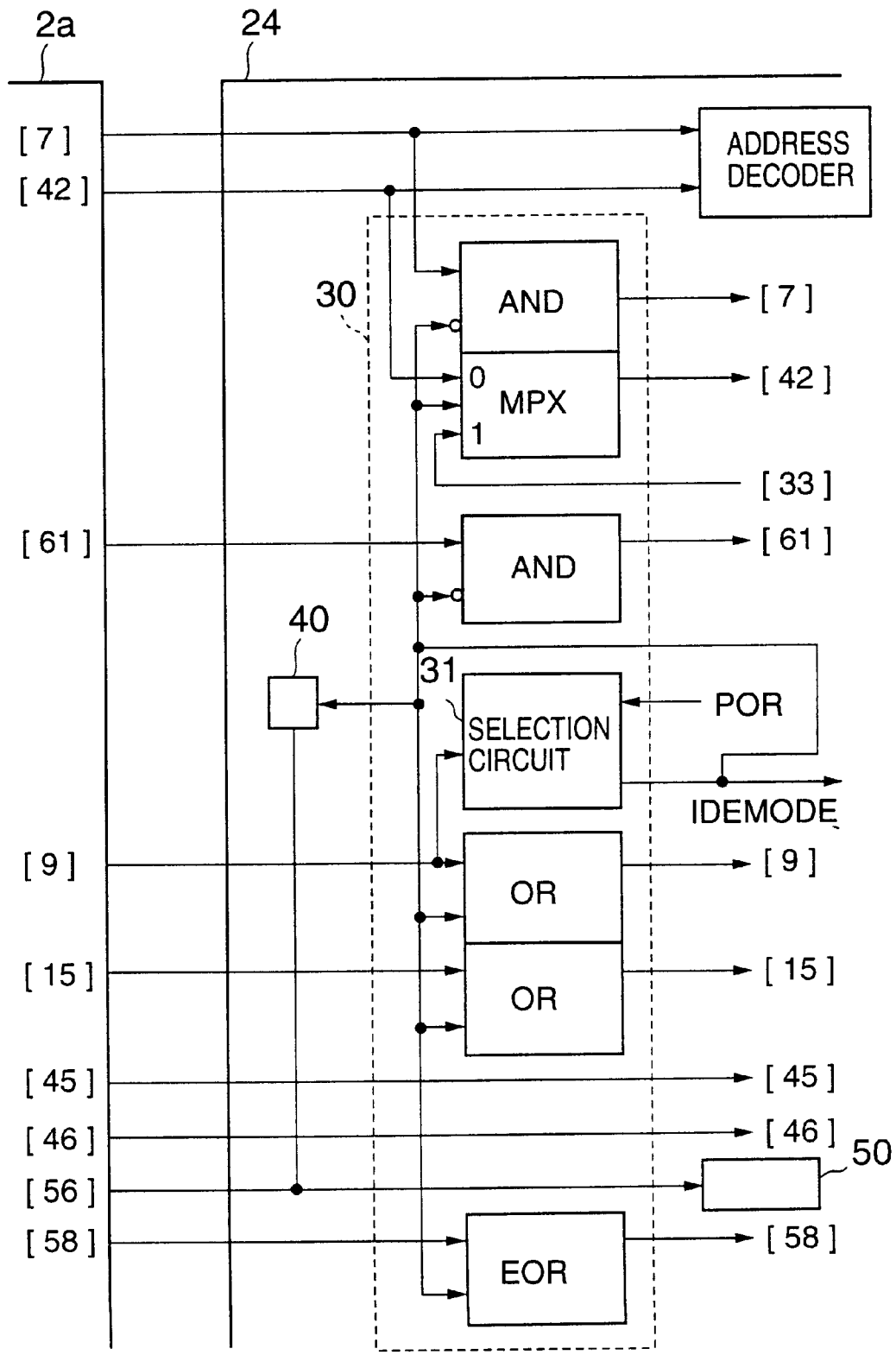
FIG. 9 is a system block diagram showing an embodiment of the circuit construction of a host controller.

FIG. 9 is a system block diagram showing an embodiment of the circuit construction of the host controller 24 within the memory card 1. In FIG. 9, numerals in brackets indicate the pin number, and for example, "[56]" indicates the 56th pin.

As shown in FIG. 9, the host controller 24 includes an adjusting circuit 30, a control circuit 40, and a judging circuit 50 which are connected as shown. The adjusting circuit 30 is provided to realize two interface standards, namely, the PCMCIA interface standard and the IDE interface standard. The control circuit 40 is provided in correspondence with the 56th pin, and controls whether or not a pull-up resistor is to be connected to the 56th pin. The address 25 is allocated to the 56th pin according to the PCMCIA interface standard, and the CSEL signal is allocated to the 56th pin according to the IDE interface standard. The judging circuit 50 uses a drive number specified by the CSEL signal, and judges whether or not to obey the access instruction issued from the personal computer 2a.

The adjusting circuit 30 includes a selection circuit 31 which generates an IDEMODE signal which indicates whether the memory card 1 is to operate under the PCMCIA interface standard or the IDE interface standard, depending on the signal issued from the personal computer 2a. This IDEMODE signal from the selection circuit 31 is supplied to a memory control function which is not shown in FIG. 9.

The adjusting circuit 30 also includes AND circuits (AND), OR circuits (OR), an exclusive-OR circuit (EOR), and a multiplexer circuit (MPX) which are connected as shown. However, these AND circuits, OR circuits, exclusive-OR circuit and the multiplexer circuit are not directly related to the subject matter of the present invention, and a description thereof will be omitted. A description of an address decoder within the host controller 24 will also be omitted for similar reasons.

Figure 10:
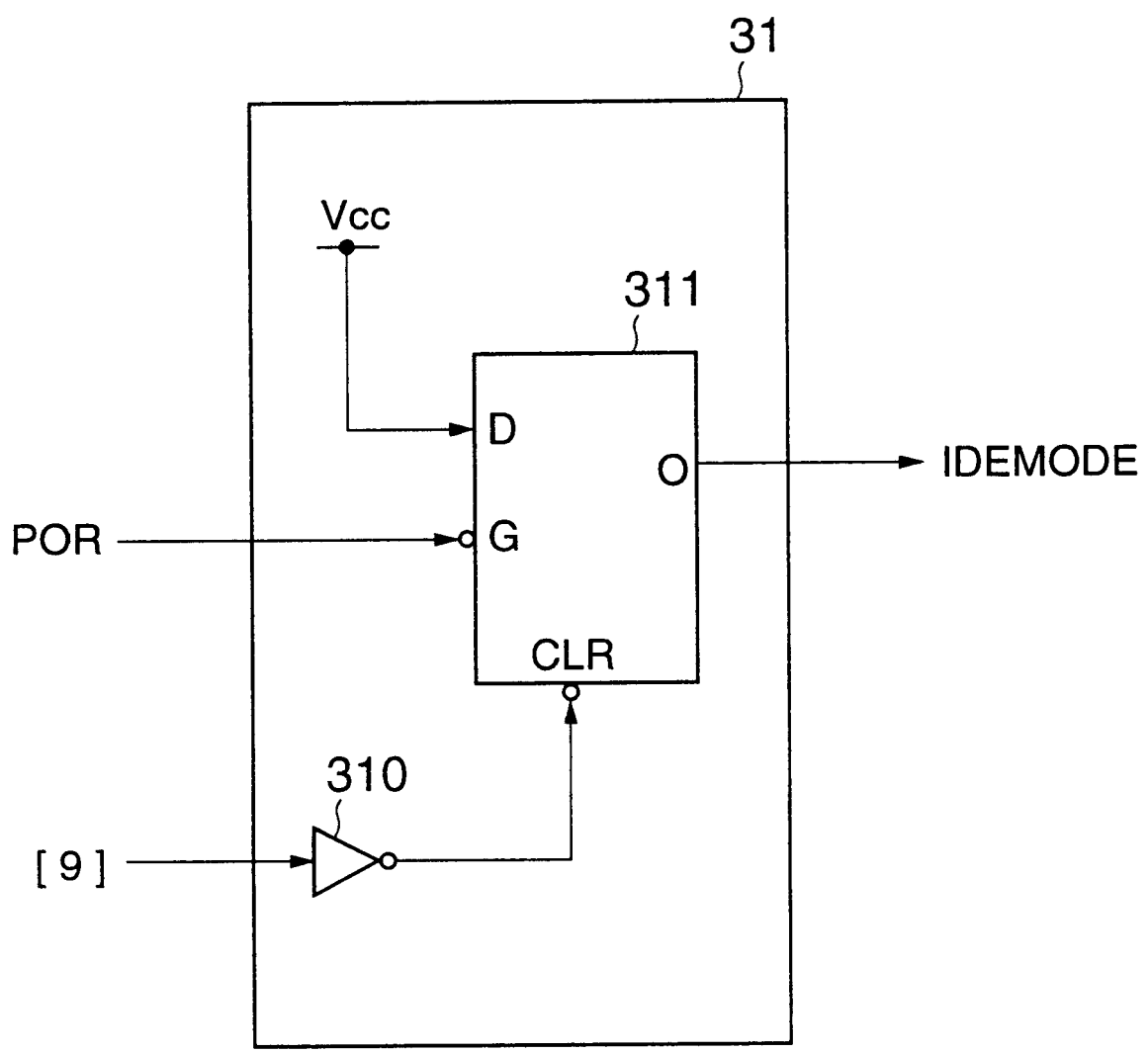
FIG. 10 is a system block diagram showing an embodiment of a selection circuit.

FIG. 10 is a system block diagram showing an embodiment of the selection circuit 31. In this embodiment, the selection circuit 31 includes an inverter circuit 310, and a latch circuit 311 which are connected as shown in FIG. 10.

The inverter circuit 310 inverts the output enable signal output from the 9th pin. The latch circuit 311 has a low-active gate terminal G, a low-active clear terminal CLR, a data terminal D which is connected to a power supply voltage Vcc, and an output terminal O. A power-ON reset (POR) signal is input to the gate terminal G, and an output signal of the inverter circuit 310 is input to the clear terminal CLR. The IDEMODE signal is output from the output terminal O.

In the selection circuit 31 having the construction described above, the latch circuit 311 reads a high-level signal value input to the data terminal D depending on a low-level signal value input to the gate terminal G, responsive to the POR signal which has a low level for a predetermined time from the time when the power is turned ON.

In this state, if the IDE interface standard is instructed from the personal computer 2a, the output enable signal output from the 9th pin has a low level, and thus, the inverter circuit 310 outputs a high-level signal. As a result, the latch circuit 311 does not carry out a clear operation, but reads the high-level signal value input to the data terminal D, and outputs a high-level IDEMODE signal from the output terminal O.

When the predetermined time elapses in this state from the time when the power is turned ON and the POR signal changes to a high level, the latch circuit 311 stops reading the high-level signal value input to the data terminal D, and consequently, the latch circuit 311 continues to output the high-level IDEMODE signal from the output terminal O.

Figure 11:
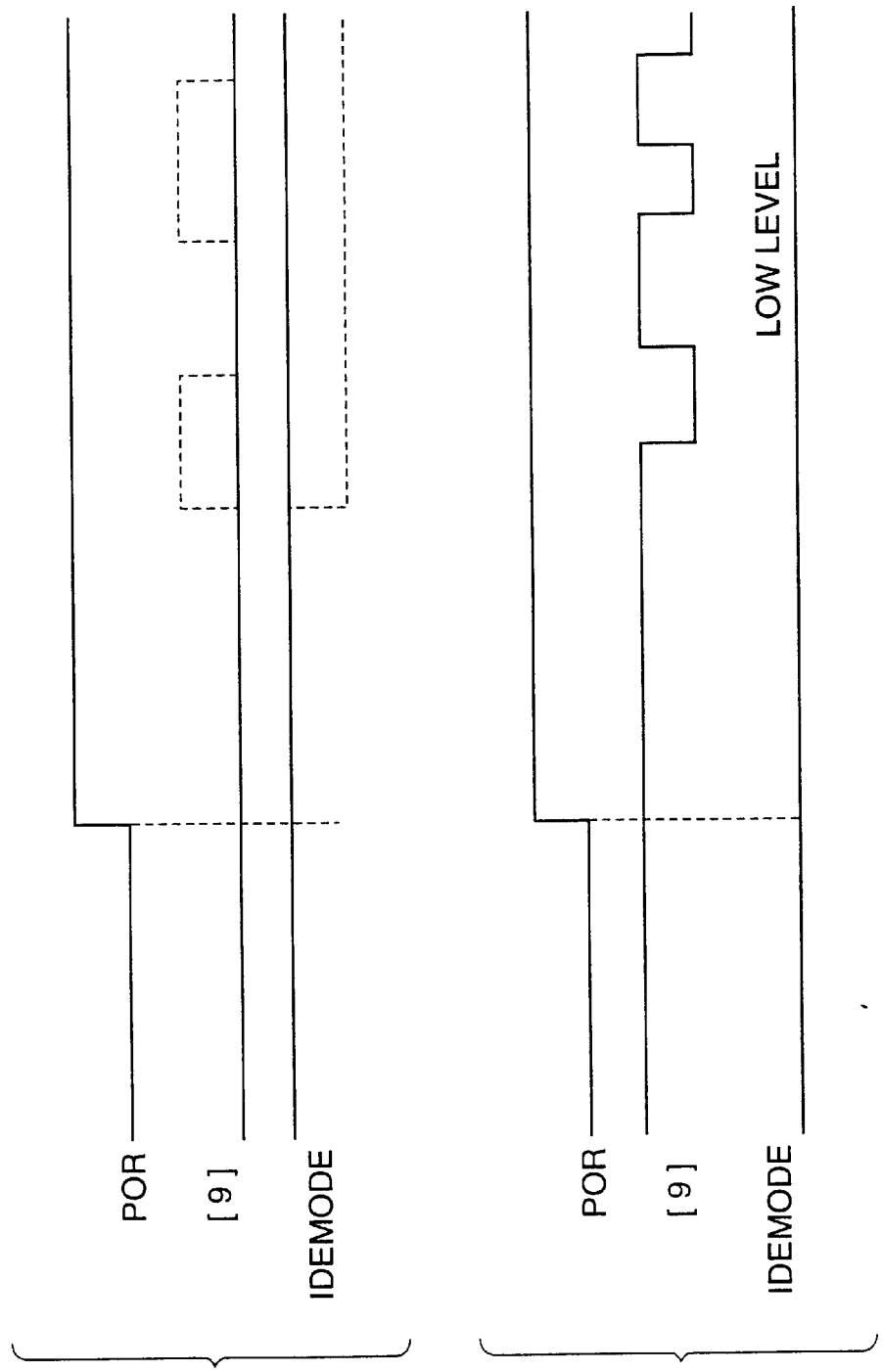
FIGS. 11A and 11B respectively are time charts for explaining the operation of the selection circuit.

In other words, when the IDE interface standard is instructed from the personal computer 2a, the selection circuit 31 outputs a high-level IDEMODE signal as shown in a time chart of FIG. 11A.

In this state, as indicated by a dotted line in FIG. 11A, when the output enable signal output from the 9th pin changes to a high level as defined by the PCMCIA interface standard, the latch circuit 311 carries out a clear operation so as to output a low-level signal. However, since the POR signal remains at the high level, the high-level signal value input to the data terminal D of the latch circuit 311 is not read, and the latch circuit 311 will thereafter not output a high-level signal.

On the other hand, when the latch circuit 311 reads the high-level signal value input to the data terminal D in response to the POR signal when the power is turned ON, the output enable signal output from the 9th pin has a high level as described above if the PCMCIA interface standard is instructed from the personal computer 2a. Hence, in this case, the output signal of the inverter circuit 310 has a low level, and as a result, the latch circuit 311 outputs a low-level signal by carrying out a clear operation.

In this state, after the predetermined time elapses from the time when the power is turned ON and the POR signal changes to a high level, the latch circuit 311 stops reading the high-level signal value input to the data terminal D, and consequently, the latch circuit 311 continues to output the low-level signal.

In other words, when the PCMCIA interface standard is instructed from the personal computer 2a, the selection circuit 31 outputs a low-level IDEMODE signal as shown in a time chart of FIG. 11B.

In this state, even if the output enable signal output from the 9th pin changes to a low level as shown in FIG. 11B, the POR signal remains at the high level. Hence, the latch circuit 311 does not read the high-level signal value input to the data terminal D, and thus, the latch circuit 311 continues to output the low-level signal.

The memory control function which is not shown in FIG. 9 operates in response to the IDEMODE signal output from the selection circuit 31, and in addition, the adjusting circuit 30 and the control circuit 40 shown in FIG. 9 operate.

As shown in FIG. 9, the adjusting circuit 30 includes the AND circuits, the OR circuits, the multiplexer circuit and the exclusive-OR circuit in addition to the selection circuit 31, as described above. In response to the IDEMODE signal output from the selection circuit 31, the AND circuits pass signals from the personal computer 2a as they are in the case of the PCMCIA interface standard, and block the signals from the personal computer 2a in the case of the IDE interface standard. In addition, the OR circuits are low-active and respectively operate as a logical product circuit having a negative logic. For this reason, similarly to the case of the AND circuits, the OR circuits pass signals from the personal computer 2a as they are in the case of the PCMCIA interface standard, and block the signals from the personal computer 2a in the case of the IDE interface standard.

In addition, the multiplexer circuit selectively outputs the input data input to a 0-input terminal in the case of the PCMCIA interface standard, and selectively outputs the input data input to a 1-input terminal in the case of the IDE interface standard. Moreover, the exclusive-OR circuit utilizes the characteristic that a reset signal according to the PCMCIA interface standard and a reset signal according to the IDE interface standard are mutually inverted, and passes the reset signal from the personal computer 2a as it is in the case of the PCMCIA interface standard, and inverts the reset signal from the personal computer 2a in the case of the IDE interface standard.

By the above described operation of the adjusting circuit 30, the memory card 1 realizes the PCMCIA interface standard when the PCMCIA interface standard is instructed, and realizes the IDE interface standard when the IDE interface standard is instructed.

Next, a description will be given of the control circuit 40 which operates in response to the IDEMODE signal output from the selection circuit 31.

Figure 12:
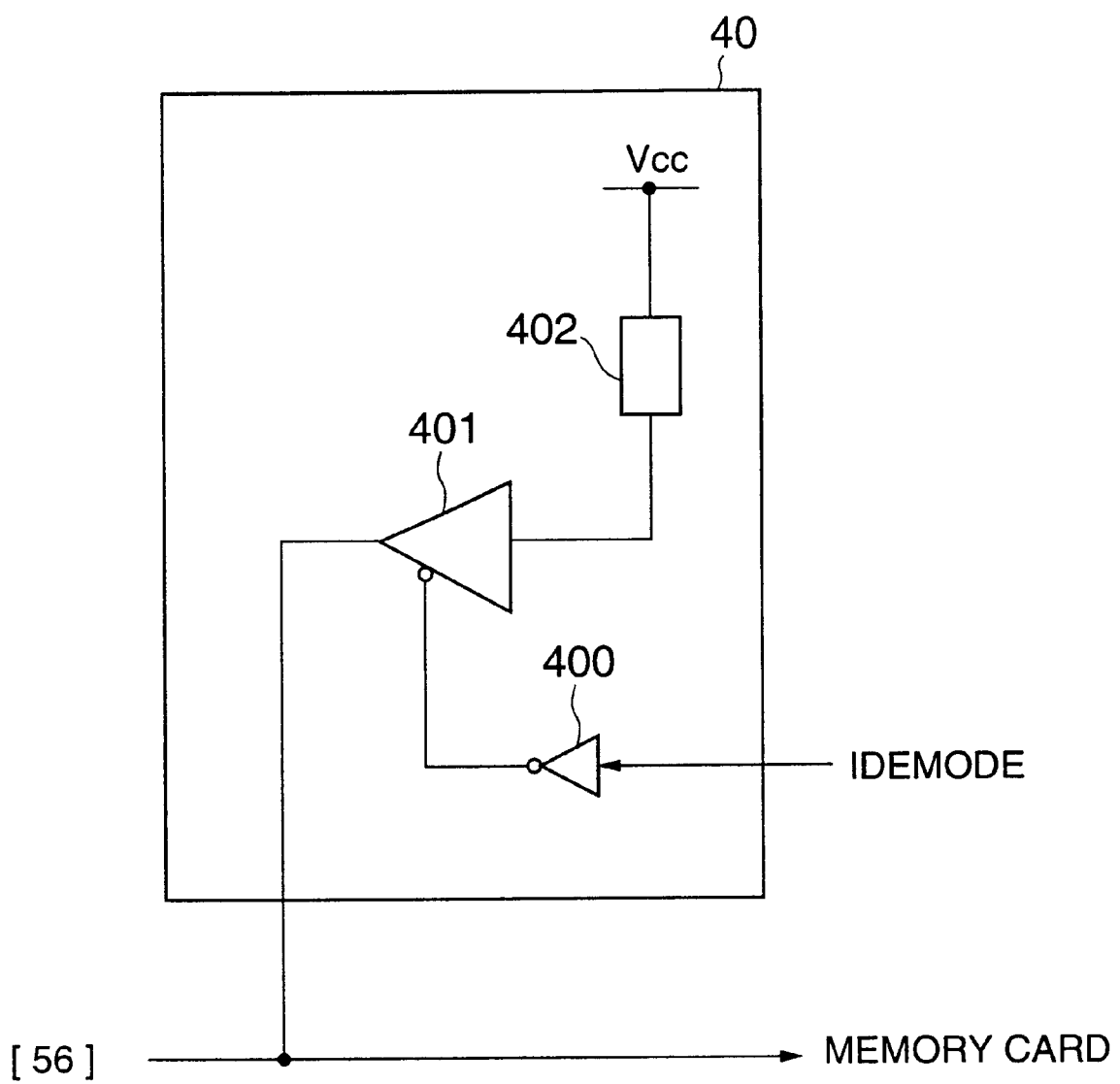
FIG. 12 is a system block diagram showing an embodiment of a control circuit.

FIG. 12 is a system block diagram showing an embodiment of the control circuit 40.

In this embodiment, the control circuit 40 includes an inverter circuit 400, a tristate buffer circuit 401, and a pull-up resistor 402 which are connected as shown in FIG. 12. The inverter circuit 400 inverts the IDEMODE signal output from the selection circuit 31. A high-level voltage is input to the tristate buffer circuit 401 via the pull-up resistor 402. An output signal of the inverter circuit 400 is supplied to the tristate buffer circuit 401 as a control signal, and an output signal of the tristate buffer circuit 401 is supplied to the 56th pin.

In the control circuit 40 having the construction described above, when the selection circuit 31 outputs a high-level IDEMODE signal which indicates the IDE interface standard, the tristate buffer circuit 401 outputs the high-level voltage received via the pull-up resistor 402, and supplies the high-level voltage to the 56th pin. On the other hand, when the selection circuit 31 outputs a low-level IDEMODE signal which indicates the PCMCIA interface standard, the tristate buffer circuit 401 outputs a high-impedance signal and supplies this high-impedance signal to the 56th pin.

When the IDE interface standard is used based on the output signal of the control circuit 40 and the CSEL signal is output from the 56th pin of the personal computer 2a, this CSEL signal is connected to the high-level voltage via the pull-up resistor 402. Hence, it is possible to detect whether the CSEL signal output from the personal computer 2a is grounded or is open-circuited.

When the PCMCIA interface standard is used based on the output signal of the control circuit 40 and a signal of the address 25 is output from the 56th pin of the personal computer 2a, the pull-up resistor 402 will not be connected to this signal of the address 25. As a result, it is possible to accurately realize the PCMCIA interface standard.

When the IDE interface standard is used, the judging circuit 50 shown in FIG. 9 operates so as to hold a drive number of the memory card 1 to which the judging circuit 50 belongs, by holding a drive number specified by the CSEL signal. When the personal computer 2a specifies a drive number and issues an access instruction, the judging circuit 50 compares the drive number of the memory card 1 and the drive number of the access instruction. If the compared drive numbers match, the judging circuit 50 notifies this match to the memory control function.

On the other hand, when the PCMCIA interface standard is used, the judging circuit 50 operates so as to hold a card number of the memory card 1 to which the judging circuit 50 belongs, by holding a card number which is written when the memory card 1 is inserted. When the personal computer 2a specifies a card number and issues an access instruction, the judging circuit 50 compares the card number of the memory card 1 and the card number of the access instruction. If the compared card numbers match, the judging circuit 50 notifies this match to the memory control function.

Figure 13:
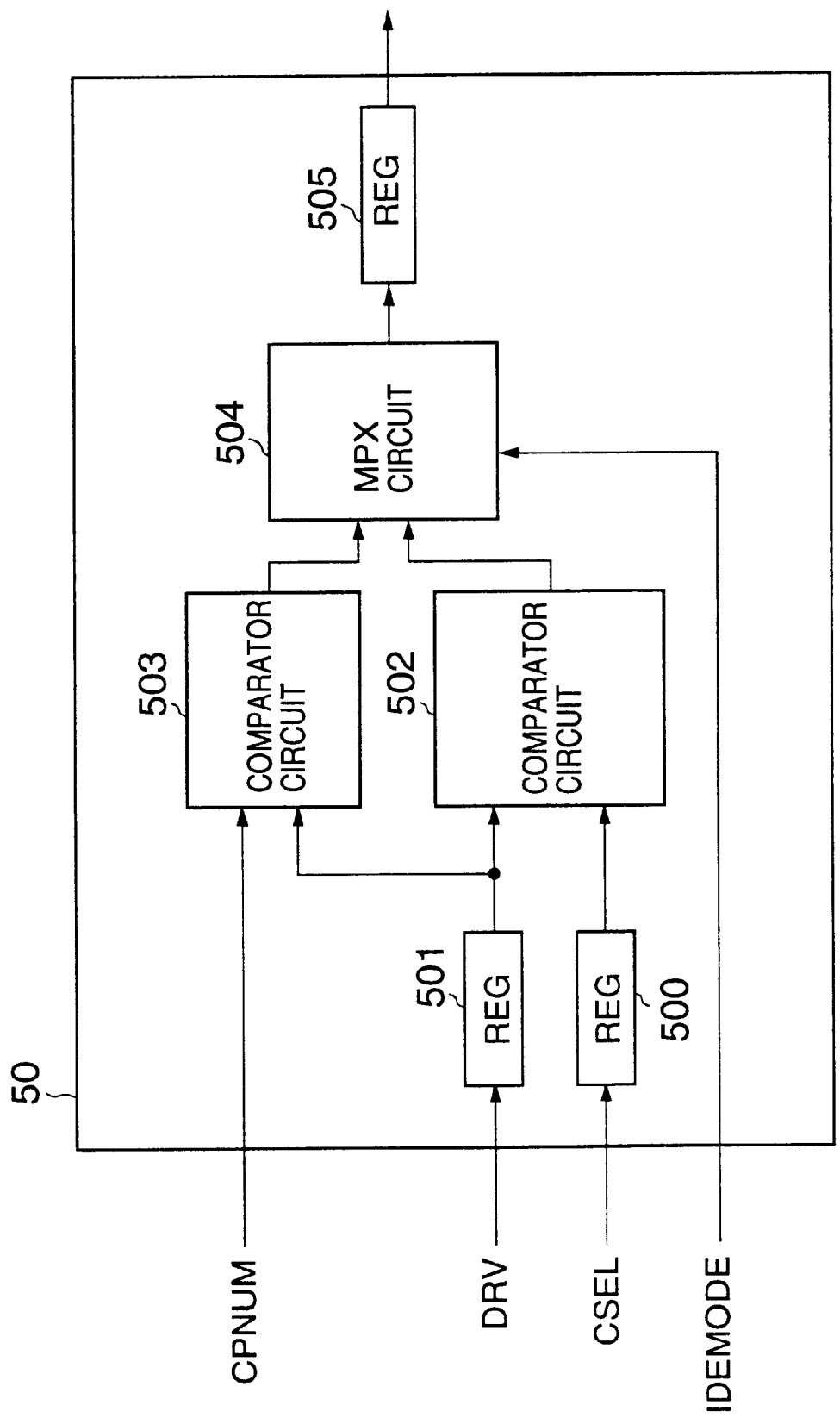
FIG. 13 is a system block diagram showing an embodiment of a judging circuit.

FIG. 13 is a system block diagram showing an embodiment of the circuit construction of the judging circuit 50. According to this circuit construction shown in FIG. 13, it is possible to specify a card number "0" and a card number "1" when the PCMCIA interface standard is used.

The judging circuit 50 includes registers 500 and 501, comparator circuits 502 and 503, a multiplexer circuit 504, and a register 505 which are connected as shown in FIG. 13. The register 500 holds a drive number ("0" or "1") specified by the CSEL signal. The register 501 holds the drive number ("0" or "1") specified in the case of an access instruction or, a card number which is written when the memory card 1 is inserted. The comparator circuit 502 detects whether or not the drive number held in the register 500 and the drive number held in the register 501 match. The comparator circuit 503 detects whether or not the card number specified in the case of the access instruction and the card number held in the register 501 match. The multiplexer circuit 504 selectively outputs a detection result of the comparator circuit 502 when the selection circuit 31 outputs an IDE-MODE signal indicating the IDE interface standard, and selectively outputs a detection result of the comparator circuit 503 when the selection circuit 31 outputs an IDE-MODE signal indicating the PCMCIA interface standard. The register 505 holds the output signal of the multiplexer circuit 504, and notifies this output signal to the memory control function which is not shown in FIG. 13.

This circuit construction of the judging circuit 50 enables the operation described above.

As described above, in the memory card 1, the control circuit 40 outputs the high-level voltage to the 56th pin when the selection circuit 31 outputs the IDEMODE signal which indicates the IDE interface standard, and outputs the high-impedance signal to the 56th pin when the selection circuit 40 outputs the IDEMODE signal which indicates the PCMCIA interface standard.

When the IDE interface standard is used according to the output signal of this control circuit 40 and the CSEL signal is output from the 56th pin of the personal computer 2a, this CSEL signal is connected to the high-level voltage via the pull-up resistor 402. As a result, it is possible to detect whether the CSEL signal output from the personal computer 2a is grounded or open-circuited.

On the other hand, when the PCMCIA interface standard is used according to the output signal of the control circuit 40 and the signal of the address 25 is output from the 56th pin of the personal computer 2a, this signal of the address 25 will not be connected to the pull-up resistor 402. For this reason, it is possible to accurately realize the PCMCIA interface standard.

Although the embodiment described above employs a construction in which the high-level voltage and the high-impedance signal are output by use of the tristate buffer circuit 40, it is of course possible to output the high-level voltage and the high-impedance signal by use of circuits having other constructions.

In addition, although the memory card of the described embodiment has the flash memory, the present invention is of course applicable to memory cards having a memory other than the flash memory.

Further, the present invention is not limited to these embodiments, but various variations and modifications may be made without departing from the scope of the present invention.

What is claimed is:

1. A memory card which realizes two interface standards, comprising:
   an input terminal receiving a grounded or open-circuited signal from a host unit when using the memory card in conformance with a first interface standard, and receiving a binary signal from the host unit when using the memory card in conformance with a second interface standard;
   a first circuit acquiring standard information which indicates the first or second interface standard, from a signal issued from the host unit;
   a second circuit outputting a high-level voltage when using the memory card in conformance with the first interface standard and outputting a high-impedance signal when using the memory card in conformance with the second interface standard, depending on the standard information acquired by the first circuit; and
   a resistor coupling an output of the second circuit and the input terminal.

2. The memory card as claimed in claim 1, wherein said first circuit acquires the standard information by use of a power-ON reset signal when power is turned ON, by sampling and latching a signal issued from the host unit.

3. The memory card as claimed in claim 2, wherein said second circuit includes a tristate buffer which receives as a control signal the standard information acquired by said first circuit.

4. The memory card as claimed in claim 1, wherein said second circuit includes a tristate buffer which receives as a control signal the standard information acquired by said first circuit.

5. A memory card comprising:
   an input terminal receiving a grounded or open-circuited signal when using the memory card in conformance with a first interface standard, and receiving a binary signal when using the memory card in conformance with a second interface standard;
   a first circuit acquiring standard information which indicates the first or second interface standard, from an external signal;
   a second circuit having an output terminal which outputs a high-level signal when using the memory card in conformance with the first interface standard and outputs a high-impedance signal when using the memory card in conformance with the second interface standard, depending on the standard information acquired by the first circuit; and
   a resistor coupling the output of the second circuit and the input terminal.

6. The memory card as claimed in claim 5, wherein said first circuit acquires the standard information by use of a power-ON reset signal when power of a host unit coupled to the memory card is turned ON, by sampling and latching a signal issued from the host unit.

7. The memory card as claimed in claim 5, wherein said second circuit includes a tristate buffer which receives as a control signal the standard information acquired by said first circuit.

8. The memory card as claimed in claim 5, wherein said first interface standard is an IDE interface standard, and said second interface standard is a PCMCIA interface standard.

* * * * *